July 4, 1939.  I. K. DORTORT  2,164,765
ELECTRIC VALVE CONVERTING SYSTEM
Filed July 2, 1937   6 Sheets—Sheet 6

Inventor
I. K. Dortort
by
Attorney

Patented July 4, 1939

2,164,765

UNITED STATES PATENT OFFICE 2,164,765

ELECTRIC VALVE CONVERTING SYSTEM

Isadore K. Dortort, Milwaukee, Wis., assignor to Allis-Chalmers Manufacturing Company, Milwaukee, Wis., a corporation of Delaware Application July 2, 1937, Serial No. 151,557

18 Claims. (Cl. 175—363)

This invention relates in general to electric valve converting systems, and more particularly to systems for transmitting current between electric lines or circuits of different characteristics in which systems means are utilized for extending the periods of current flow through the different valves forming part of the system.

Electric valve converting systems which comprise at least one alternating current circuit frequently utilize so-called interphase transformers for extending the periods of current flow through each of the valves of the system. The purpose of such extension is to reduce the maximum value of the current through each valve and to thereby reduce the value of the voltage drop caused by such flow of current in the valve and in any windings associated therewith to improve the efficiency of the system. Such interphase transformers, however, present the inherent disadvantage of being easily saturated and hence rendered ineffective when the currents flowing through the windings thereof are not substantially balanced. Interphase transformers may also cause the appearance of disturbing high frequency oscillations in the associated circuits which render the use of interphase transformers undesirable in systems sensitive to such oscillations, such as high voltage direct current inverting systems. Considerable noise may also result from vibration of the core of the interphase transformers at the frequency of the alternating magnetic flux produced therein. When the output of the system is regulated by means of control electrodes controlling the conductivity of the valves, such disadvantages are rendered more pronounced and, in addition, the interphase transformer becomes excessively large and expensive and causes excessive voltages to appear between the anode and the cathode of each valve immediately prior to the period of current flow therebetween.

For these reasons, it has been found preferable to extend the period of current flow through the different valves by the use of means other than interphase transformers, such as electric filters or reactors which are not subject to the disadvantages enumerated above. Some embodiments of such means also present the considerable advantage of causing the pulsating and alternating currents flowing through different parts of the system, including the alternating current circuit, to be substantially sinusoidal and in phase with the corresponding voltages, thus improving the power factor, efficiency, and regulation of the system and reducing the danger of interference of the system with adjacent communication systems. The means utilized may also comprise means for causing successively operating valves to carry currents of equal magnitudes if such currents have a tendency to become unbalanced.

It is, therefore, one of the objects of the present invention to provide an electric valve converting system utilizing a plurality of electric valves and a transformer in which the wave form of the voltages induced in the windings of the transformer is modified for extending the periods of current flow through the different valves.

Another object of the present invention is to provide an electric valve converting system utilizing a plurality of electric valves and a transformer having windings in polyphase connection comprising $p$ phases in which the flow of harmonic current of order $p$ is substantially prevented.

Another object of the present invention is to provide an electric valve converting system utilizing a plurality of electric valves and a transformer, in which the currents flowing through the transformer are of substantially sinusoidal wave form.

Another object of the present invention is to provide an electric valve converting system utilizing a plurality of electric valves and a transformer in which the flow of current through the valves extends over a period of substantially one-half cycle of the voltage impressed on the transformer.

Another object of the present invention is to provide an electric valve converting system utilizing a plurality of electric valves and a transformer having a star connected primary winding in which the different phase portions of the transformer and the different valves associated therewith are caused to carry substantially equal currents.

Objects and advantages other than those above set forth will be apparent from the following description when read in connection with the accompanying drawings, in which.

Any element utilized in several of the embodiments illustrated is designated by the same reference character in the different figures showing such embodiments. It will be understood that elements illustrated in one embodiment may also be combined with elements illustrated in other embodiments shown to form further embodiments of the invention.

Figure 1:
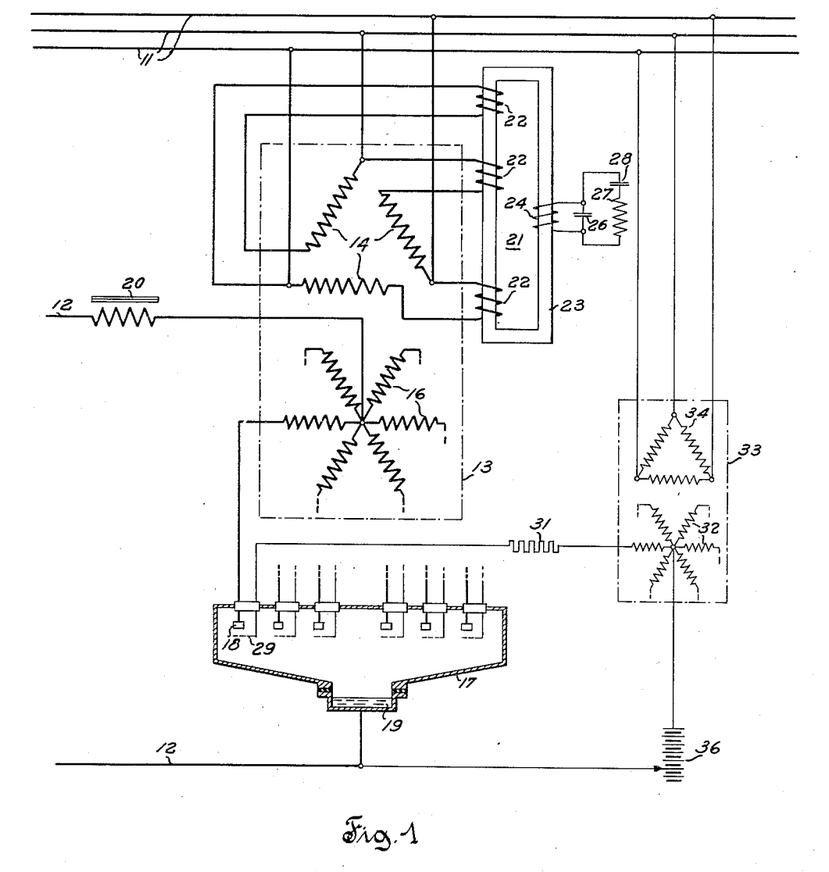
Fig. 1 diagrammatically illustrates one embodiment of the present invention utilized for extending the periods of current flow through the valves forming part of a rectifying-inverting system comprising a transformer having a delta connected primary winding, the desired result being obtained by means of a reactor having windings severally connected in series with the phase portions of the transformer primary winding.

Referring more particularly to the drawings by characters of reference, the electric current translating system illustrated in Fig. 1 comprises an alternating current line or circuit 11 and a direct current line or circuit 12. The transmission of energy between the two circuits is effected by means of a combination of apparatus comprising a transformer 13 having a plurality of windings including a first winding 14 and a second winding 16. Winding 14 comprises three phase portions connected in delta and energized from the conductors of circuit 11, and winding 16 is divided into a plurality of phase portions connected in star to form a neutral point. Throughout the present specification it will be assumed that the flow of energy is from circuit 11 to circuit 12, and that windings 14 and 16 accordingly function as primary winding and as secondary winding, respectively, but it will be understood that the system is equally adapted for the flow of energy from circuit 12 to circuit 11 by suitable adjustment of the control elements of the system. The core of transformer 13 may be of any known type and may comprise a plurality of physically separate phase portions; such core may also consist of a unitary structure, provided that such structure enables the magnetic flux in each phase portion thereof to be entirely independent of the values of the magnetic fluxes in the other phase portions.

A plurality of electric valves 17 are provided for connecting the phase portions of winding 16 with circuit 12 for the flow of current therebetween through the different valves during predetermined periods. Valves 17 may be of any known type if the system is used only for rectifying alternating current obtained from circuit 11 and for supplying the rectified current to circuit 12. The valves may be of any known controllable type, as shown, if the system is also utilized for inverting direct current obtained from circuit 12 and for supplying the resulting alternating current to circuit 11. Valves 17 are preferably of the discontinuously controllable or vapor type, each comprising an anode 18 and a cathode, the cathodes of the different valves either being distinct or else being combined into a single cathode structure 19 arranged within a casing common to all the valves, as illustrated on the drawings. Cathode 19 comprises an electron emitting element which may be a pool of mercury, and suitable known means (not shown) are provided for bringing the cathode into electron emitting condition and for maintaining the cathode in such condition.

In the present embodiment, winding 16 is provided with six phase portions connected with the anodes of six valves to form a six phase rectifying system, but it will be understood that winding 16 may also be provided with twelve phase portions connected with twelve valves to form a twelve phase rectifying system. Cathode 19 is connected with one conductor of circuit 12, the other conductor of such circuit being connected with the neutral point of winding 16. Circuit 12 is generally of inductive character, and frequently comprises a reactor 20 for smoothing the flow of current therein. By reactor is meant an impedance device having an inductive character throughout the present specification.

For the purpose of controlling the flow of current through valves 17, and more particularly for extending the periods of current flow through such valves, there are provided means comprising impedance means such as a reactor 21 having a plurality of windings 22 connected with transformer 13 and operating exclusively in dependence upon the flow of current through transformer 13 for modifying the wave form of the voltages appearing in the windings of the transformer. The windings 22 of reactor 21 are arranged on a common core 23 and are severally inserted in the different sides of the delta of connections formed by the phase portions of winding 14. The action of reactor 21 may also be modified by providing the reactor with a single phase secondary winding 24 supplying current to suitable impedance devices, the reactor then becoming in effect an auxiliary transformer. Winding 24 preferably supplies current to a capacitor 26 to which may be adjoined a reactor 27 and a second capacitor 28.

For further controlling the flow of current through valves 17, each valve is provided with suitable known conductivity controlling means such as a control electrode 29. The control electrodes are diagrammatically represented as grids on the drawings, but such control electrodes may also consist of cathode spot igniting devices when the valves are provided with separate cathodes. Valves 17 being assumed as being of the discontinuously controllable type, it may be assumed that each control electrode prevents the flow of current through the associated anode when the control electrode is at a negative potential with respect to the potential of cathode 19 taken as datum for control potentials, the control electrode releasing such flow of current upon being brought to a positive potential with respect to the cathode potential. To control the sequential moments of initiation of the flow of current through the different valves 17, the different control electrodes are brought sequentially to a positive potential by any suitable known means. Such result may be obtained by severally connecting the control electrodes with cathode 19 through circuits each comprising a current limiting resistor 31 and one of the phase portions of the secondary winding 32 of a control transformer 33 having a primary winding 34 connected with circuit 11. Winding 32 is connected in star to form a neutral point which is preferably connected with cathode 19 through a source of adjustable unidirectional voltage such as a battery 36.

The operation of the system will be considered under the assumptions that circuit 11 is a supply circuit energized from a suitable source of alternating current (not shown) having a substantially sinusoidal output voltage of a predetermined fundamental frequency, and that rectified current is to be delivered by the system to a load device (not shown) connected with circuit 12. The voltages impressed from circuit 11 on the phase portions of winding 14 induce corresponding voltages in the associated phase portions of winding 16, whereby anodes 18 are sequentially brought to a positive potential with respect to the potential of cathode 19. When an anode has thus assumed a positive potential, the flow of current therethrough is prevented as long as the associated control electrode remains at a negative potential. Upon this control electrode receiving a positive potential by the joint action of winding 32 and of battery 36, the flow of current through the anode considered is initiated, such flow of current continuing until the transfer thereof to another anode. The successive anode current impulses thus produced combine at cathode 19 to form a flow of substantially uniform direct current, as is well known in the art.

Figure 7A:
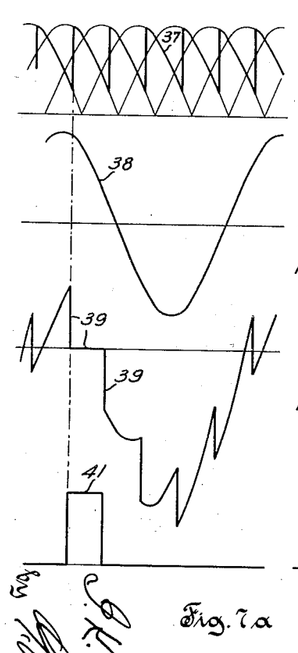
Fig. 7 is a diagram of some of the voltages and currents appearing in some of the circuits of the different embodiments illustrated and of some systems of the art.

To render more apparent the distinctions between the operations of the system illustrated in Fig. 1 and of the systems known in the art, it will be assumed at first that reactor 21 be removed. The system illustrated then becomes a well known system of the art in which the valve supply transformer is a three phase transformer having a delta connected primary winding energized from a three phase supply circuit. Curves of some of the voltages appearing in the known system and of one anode current thereof are illustrated in Fig. 7a. Such curves are drawn assuming a transformer ratio equal to unity, an adjustment of battery 36 causing the conductive periods of anodes 18 to be delayed by 45°, and neglecting the inductance and resistance of the transformer windings as well as the voltage drop in valves 17. Curve 37 representing the output voltage of the known system consists of a series of consecutive portions of the sine waves representing the induced voltages in the different portions of winding 16. The voltage induced in a particular one of such winding portions is represented by a sinusoidal curve 38. The voltage present between the anode associated with such winding portion and cathode 19 is represented by a curve 39 having ordinates equal to the difference between the ordinates of curves 37 and 38. The current flowing through such anode may be represented by a rectangular curve 41 if the inductance of reactor 20 is of relatively high value.

Figure 8:
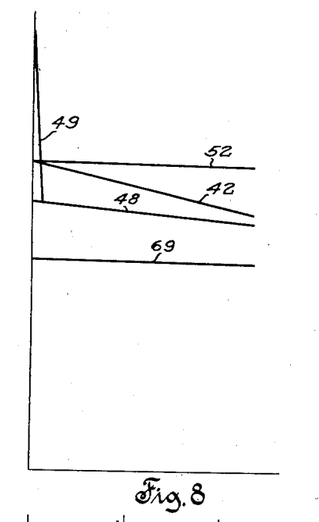
Fig. 8 is a diagram of the output volt-ampere characteristics of the different embodiments illustrated.

The variation of the output voltage of the known system in function of the output or load current thereof is represented by a linear volt-ampere characteristic 42 of Fig. 8 having a slope depending on the inductance of the windings of transformer 13. In the known system, each of the currents flowing in the several primary winding sections presents a large component having a frequency triple of the fundamental frequency, the so-called third harmonic current component, and other harmonic components of frequencies multiple of such triple frequency, the harmonic currents of the different phase portions being in phase with each other and circulating in the delta connected winding as a single current without appearing in circuit 11.

When, however, windings 22 of reactor 21 are serially connected with the phase portions of winding 14 as illustrated in Fig. 1, the reactor functions as impedance means opposing a selective impedance to the flow of alternating current exclusively through the transformer, such impedance being relatively low for the flow of current of fundamental frequency and being relatively high for the flow of currents of other frequencies, including selected frequencies multiple of the fundamental frequency. More particularly, the three current components of fundamental frequency flowing through the phase portions of winding 14, and the components of frequencies multiple of the fundamental frequency except the above triple frequency and the multiples thereof, all form three phase systems of currents which flow through windings 22 and which subject core 23 to a total magnetomotive force which is equal to zero at every instant, thus producing no magnetic flux in such core. The impedance of reactor 21 for currents of such frequencies is therefore substantially zero. The current components of triple frequency and the multiples thereof, on the contrary, tend to flow in phase coincidence in all windings 22 and are reduced by the action of the reactor to such low values as are necessary to cause magnetization of core 23, which values may be reduced to any desired extent by increasing the cross section of core 23. The reactor thus functions for substantially preventing the flow of current of frequency triple of the fundamental frequency in delta connected winding 14 at all loads, except at loads of such low value that the currents in windings 22 cannot include an amount of third harmonic component sufficient to magnetize core 23.

Figure 9A:
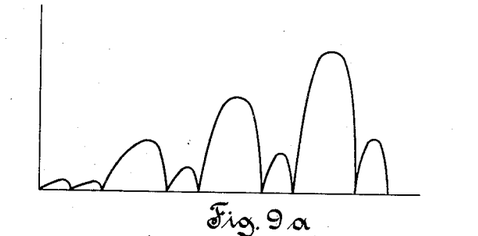
Fig. 9 is a diagram of the reactance of the impedance means utilized in the different embodiments illustrated.

The impedance of reactor 21 varies in function of the frequency of the currents flowing through windings 22 as illustrated in Fig. 9a, in which the peaks of the curve correspond to substantially the third harmonic frequency and the multiples thereof, and the points of zero ordinate correspond to the fundamental frequency and to the remaining multiple frequencies thereof. The action of reactor 21 in substantially preventing currents of certain frequencies from flowing in windings 22 involves the appearance of voltages of corresponding frequencies in such windings, with the result that the wave form of the voltages appearing in the phase portions of winding 14 is caused to depart from the sinusoidal wave form of the voltages of circuit 11.

Figure 7B:
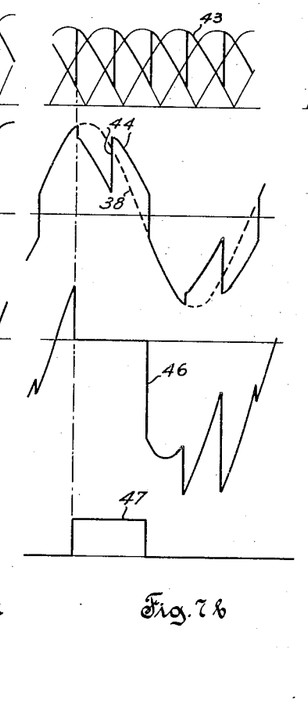

As a result of the modification of the operating condition of the system by reactor 21, the curves of Fig. 7a continue to be representative of the operation of the system only at substantially no load. At all loads above a so-called critical load, at which the core of reactor 21 becomes fully magnetized, the operation of the system is represented by the curves of Fig. 7b. In such figure, curve 43 represents the output voltage of the system, curve 44 represents the voltage appearing in one of the phase portions of winding 14 and in the corresponding portion of winding 16, and the voltage appearing between the anode 18 associated therewith and cathode 19 is represented by a curve 46 having ordinates equal to the difference between the ordinates of curves 43 and 44. The voltage appearing across one of the windings 22 is represented by the difference of ordinates of curves 44 and 38. Although such voltage is not a continuous third harmonic voltage, the sum of the three voltages appearing across the three windings 22 is a continuous third harmonic voltage distorted by other harmonic voltages of frequencies multiples of the triple frequency, so that reactor 21 is able to function in the manner above indicated. Curve 47 represents the current flowing through the anode 18 considered.

It will be apparent from a consideration of curves 41 and 47 that, as a result of the action of reactor 21, the period of current flow through the anode has been substantially doubled in length. Assuming that the total output current has remained unchanged, the peak value of the anode current has been reduced by one-half, thereby improving the efficiency of the system. It will be understood that under such conditions two of the anodes 18 are carrying current simultaneously every instant. The output voltage characteristic of the system comprises a straight line 48 in Fig. 8 representing the output voltage of the system at substantially all loads and another straight line 49 representing the output voltage at loads below the critical load. The improvement of the regulation of the system at all loads above the critical load is evidenced by the fact that the slope of line 48 is equal to less than one-half of the slope of line 42.

Figures 7C, 7D:
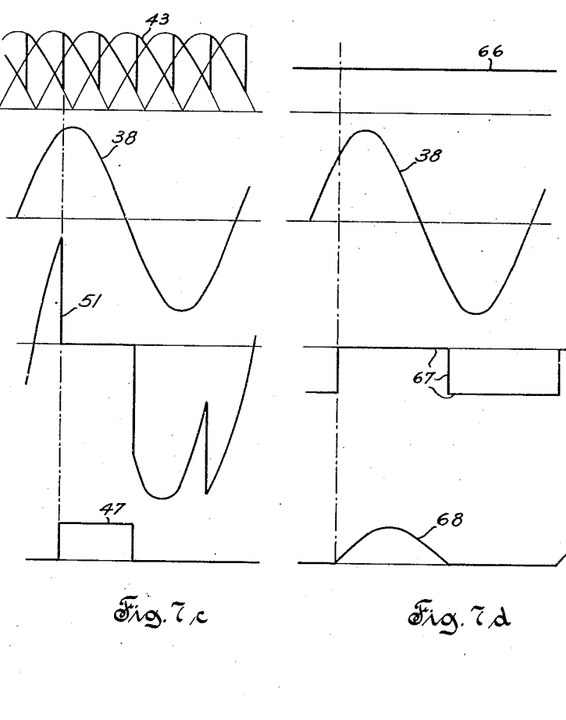

The curves drawn in Fig. 7c are representative of the operation of the system disclosed in U. S. Patent 1,214,505 to Fortescue, issued October 2, 1917, which utilizes the so-called interphase transformer, and are represented in the drawings to render apparent another advantage of the system disclosed herein over the frequently utilized system of the said patent. In Fig. 7c, curves 38, 43 and 47 are retained without modification as they are representative of the operation of the system of the patent, but the voltage appearing between one anode 18 and cathode 19 is represented by a new curve 51. The output volt-ampere characteristic of such system is represented by lines 48 and 49 of Fig. 8 and the system thus has the same general characteristics as the system illustrated in Fig. 1. It may be observed from a comparison of curves 46 and 51 that the voltage appearing between an anode 18 and cathode 19 immediately before the period of current flow through the anode is considerably lower in the system illustrated in Fig. 1 than in the system of the said patent. The duty of control electrode 19 is therefore considerably lessened and the danger of improper operation thereof is correspondingly reduced.

Considering the operation of reactor 21 somewhat more in detail, it will be observed that each winding 22 thereof is unavoidably linked with a magnetic leakage flux which does not link with the other windings 22 and which causes the reactor to offer a slight amount of reactance to the flow of current of all frequencies, and also that the three windings 22 jointly carry a small amount of third harmonic current required for magnetizing core 23. Reactor 21 thus has an inductive character at all frequencies. By providing the reactor with winding 24 supplying current to capacitor 26, such inductive character may be lessened, neutralized or even changed to a capacitive character.

Capacitor 26 may be selected of such size that the impedance thereof for the flow of third harmonic current is equal in magnitude to the impedance of reactor 21 for third harmonic magnetizing current, capacitor 26 and reactor (or auxiliary transformer) 21 then being said to be tuned to resonance for a frequency triple of the fundamental frequency to thereby neutralize the inductance of the reactor for such frequency. The system may then function in the manner illustrated in Fig. 7b at substantially all loads since it is then no longer necessary for the current flowing in windings 22 to be sufficiently large to supply magnetizing current to the reactor, such magnetizing current circulating between winding 24 and capacitor 26 when the value of the load approaches zero. The value of the critical load of the system is thus lowered to substantially no load, and the output characteristic of the system consists of line 48 only. The combination of capacitor 26 with reactor 27 and capacitor 28 may also be tuned with reactor 21 for both the third harmonic frequency and for a frequency multiple thereof to also provide for the circulation of magnetizing current of such multiple frequency between winding 24 and the elements connected therewith and thus render the action of reactor 21 more perfect at low loads.

Capacitor 26 used alone may also be selected of such large capacity as to cause reactor 21 to offer only a negligible impedance to the flow of current of any frequency in windings 22. The voltages appearing in winding 14 and 16 are then caused to be of substantially sinusoidal wave form as in the absence of reactor 21. Reactor 21 and capacitor 26 then jointly operate as a device of capacitive character and no longer prevent the flow of harmonic or other currents through winding 22 and the system operates as illustrated in the several curves of Figs. 7a. In addition, capacitor 26 neutralizes the well known effect of the leakage reactance of the winding of transformer 13 which, in the absence of the capacitor, would prevent the substantially instantaneous transfer of current from one anode 18 to another and would thus cause distortion of the curves illustrated in Fig. 7a to an extent proportional to the value of the load current. As a result of the presence of capacitor 26, current is substantially instantly transferred from one anode to another, and the curves of Fig. 7a remain substantially unchanged at all loads. The output characteristic of the system is then a straight line 52 having a slope caused only by the voltage drop due to the resistance of the circuits of the system. By properly selecting the value of capacitor 26, other output characteristics intermediate lines 52 and 48 may also be obtained.

Reactor 21 may also be selected of such dimensions as to become saturated when the currents flowing through windings 22 reach a predetermined value. The output characteristic of the system then becomes discontinuous, such characteristic following line 52, line 48 or an intermediate line for the values of load below the predetermined value according to the size of capacitor 26 and following line 42 at loads exceeding such value. The two portions of the characteristic are joined by a transition curve of shape depending upon the magnetic characteristic of reactor 21.

The operation of the system as above described is not altered in any material respect when the flow of energy is from circuit 12 to circuit 11, circuit 12 being assumed connected with a suitable source of direct current (not shown). Although the above description is limited to a system comprising a three phase supply line and including a reactor 21 having three windings 22, it will easily be understood that a reactor having windings 22 in any number $p$ may also be utilized for preventing the flow of harmonic current of order $p$ in a $p$ phase transformer primary winding connected in polygon and supplied with current from a $p$ phase alternating current supply circuit.

Figure 2:
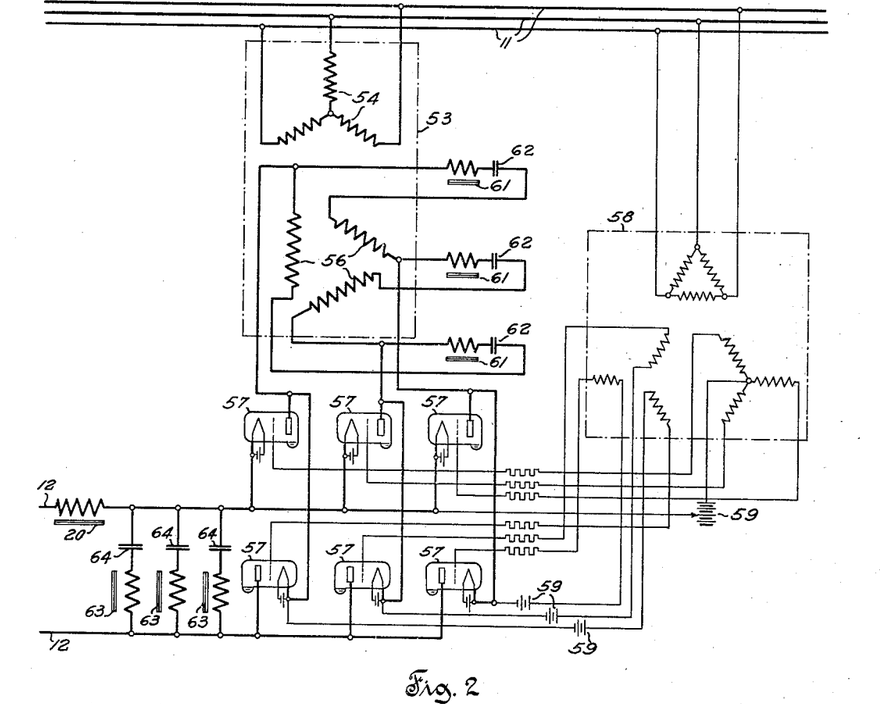
Fig. 2 diagrammatically illustrates another embodiment of the invention applied to the control of a rectifying-inverting system comprising a transformer having a delta connected secondary winding, in which the periods of current flow through the valves are extended by means of resonant filters severally connected in series with the phase portions of the transformer secondary winding.
Figure 3A:
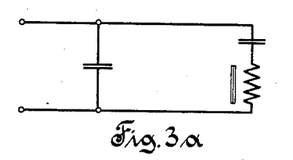
Fig. 3 diagrammatically illustrates several modified forms of the filters utilized in the embodiment illustrated in Fig. 2.
Figure 3B:
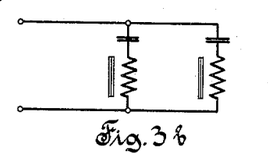
Figure 3C:
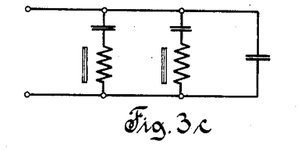
Figure 3D:
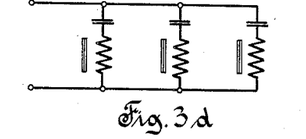

In the embodiment illustrated in Fig. 2, the converting system comprises a supply transformer 53 having a primary winding 54 connected in star energized from circuit 11 and a delta connected secondary winding 56. Transformer 53 differs from the other supply transformers herein described and illustrated in that the core of transformer 53 may be of a type causing the magnitudes of the magnetic fluxes in the several phase portions thereof to be interdependent. A plurality of electric valves 57 are provided for connecting the phase portions of winding 56 across circuit 12 for the flow of energy between the two circuits. In the present embodiment the valves are connected in so-called full wave connection, and it is no longer possible to join the cathodes of all the valves into a single structure. Valves 57 have, however, the same operating characteristic as valves 17 and are provided with control electrodes energized from circuit 11 through a transformer 58 and a plurality of bias batteries 59. Means are connected with transformer 53 for causing valves 57 to carry substantially equal sinusoidal currents during different periods each of extent equal to substantially one-half cycle of the fundamental frequency. Such means comprise filter means which may be arranged in the connections between the transformer and one of circuits 11 and 12, and which are shown as divided into a plurality of filter elements each comprising a reactor 61 and a capacitor 62 serially connected with one of the phase portions of winding 56. Such filters cooperate with means connected across circuit 12 and forming a path of negligible impedance for the flow of currents of frequencies multiple of the fundamental frequency, such as a plurality of filters each comprising a reactor 63 serially connected with a capacitor 64.

Figure 9B:
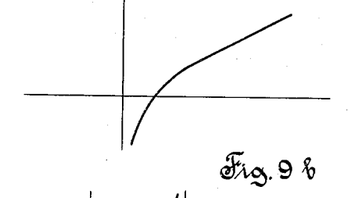
Figure 9C:
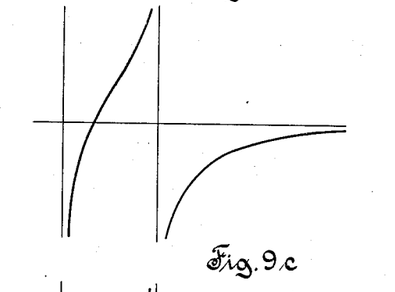
Figure 9D:
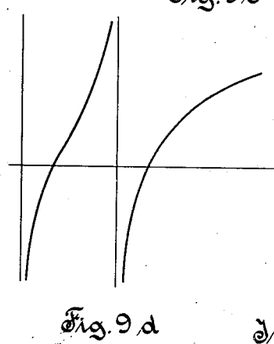

In the absence of filters 61, 62 and 63, 64, the system illustrated in Fig. 2 would be a well known system of the art operating under an output voltage characteristic represented by line 42 in Fig. 8. During such operation of the known system, the currents flowing through the windings of transformer 53 have the non-sinusoidal wave form represented by curve 47 although the voltages appearing in the phase portions of windings 54, 56 have a substantially sinusoidal wave form. Filters 61, 62 or other equivalent impedance means serially connected with windings 56 are so dimensioned that the sum of the leakage reactances of a pair of cooperating primary and secondary winding sections of transformer 53, plus the impedances of the associated reactor 61 and capacitor 62, is substantially zero for currents of fundamental frequency, the impedance means and the transformer being said to be tuned for the fundamental frequency to form a selective path for the flow of current of fundamental frequency through winding 56. The impedance opposed to the flow of current in any transformer phase then varies as the function of the frequency of such current as illustrated in Fig. 9b, such impedance being zero for current of fundamental frequency and being of considerable value for all currents of frequencies multiple of the fundamental frequency. Filters 61, 62 accordingly cause the currents flowing through the phase portions of winding 56 to assume a substantially sinusoidal wave form. The periods of current flow through valves 57 and through the associated portions of winding 56 are thus extended from substantially one-third to one-half cycle of the fundamental frequency, thereby decreasing the average value of the current impulses through the valves and improving the efficiency of the system. As a result of the inductive coupling of windings 54 and 56, the currents flowing in winding 54 and in circuit 11 must necessarily also be of sinusoidal wave form, and the danger of inductive interference between circuit 11 and adjacent communication circuits is lessened to a considerable extent. The wave form of the voltages appearing across the different phase portions of windings 54 and 56 is the sinusoidal wave form represented by curve 38.

The current flowing between valves 57 and circuit 12 comprises a direct current component on which are superposed a plurality of alternating components of frequencies multiple of the fundamental frequencies, of which the 6th, 12th and 18th harmonics are most prominent in the system illustrated. The above explanation of the operation of the system implies that both the ohmic resistance of circuit 12, and the reactance of such circuit for the flow of such alternating components are of low value compared to the impedance of filters 61, 62 for the flow of the components tending to flow therethrough. In general, however, circuit 12 is of inductive character and presents a relatively high impedance to the flow of the alternating current components therethrough. To obtain the desired operation of the system, filters 63, 64 are connected across circuit 12, each filter forming a path of negligible impedance for the flow therethrough of one of the current components. Under such conditions, the output voltage of the system is substantially free of all alternating components and may be represented by line 66 in Fig. 7d, the voltage appearing in one of the phase portions of winding 56 being represented by curve 38. The voltage appearing between the anode and the cathode of one of valves 57 is represented by a rectangular curve 67, and the current flowing through such valve represented by a sinusoidal curve 68 extending over a period of substantially one-half cycle of the fundamental frequency. The output voltampere characteristic of the system is a straight line 69 of Fig. 8 having a slope depending on the resistance of windings 54 and 56.

Figure 9E:
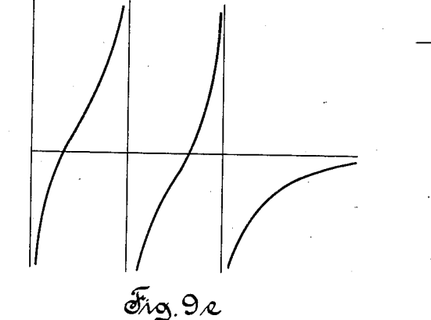
Figure 9F:
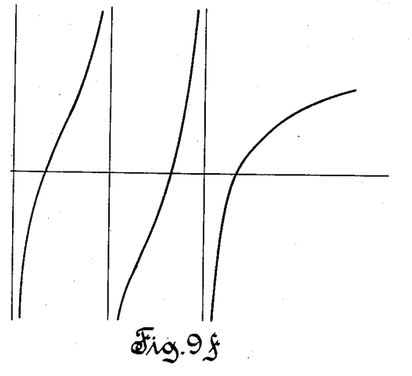

Although filters 61, 62 may be so selected as to have any desired value of impedance for the flow of current of a predetermined frequency, it may be more advantageous to utilize more elaborate filters which present very high selective impedances for the flow of currents of different predetermined frequencies. A few examples of such filters are illustrated in Figs. 3a, 3b, 3c and 3d, the joint impedance of such filters and of the transformer windings being represented in Figs. 9c, 9d, 9e and 9f respectively. Such filters are so dimensioned as to substantially prevent any flow of current of frequency triple of the fundamental frequency therethrough and to also prevent the flow of currents of other selected frequencies multiple of the triple frequency. Such filters also permit currents of other selected frequencies to flow freely in winding 56 when voltages of such frequencies are present. In particular, if the joint impedance of the filter and of the associated portions of windings 54 and 56 may be represented as shown in Fig. 9e, fifth harmonic currents will circulate freely through windings 56. If such impedance may be represented as shown in Fig. 9f, both fifth and seventh harmonic currents may circulate through windings 56. The output characteristics obtained under such conditions are intermediate lines 48 and 69.

The reactors utilized in any of the filters illustrated in Fig. 2 and Fig. 3 may be so dimensioned as to become saturated when the load current delivered by the system reaches a predetermined value, the characteristic of the system then being represented by a line intermediate line 52 and line 42 for values of the load current exceeding such predetermined value.

Figure 4:
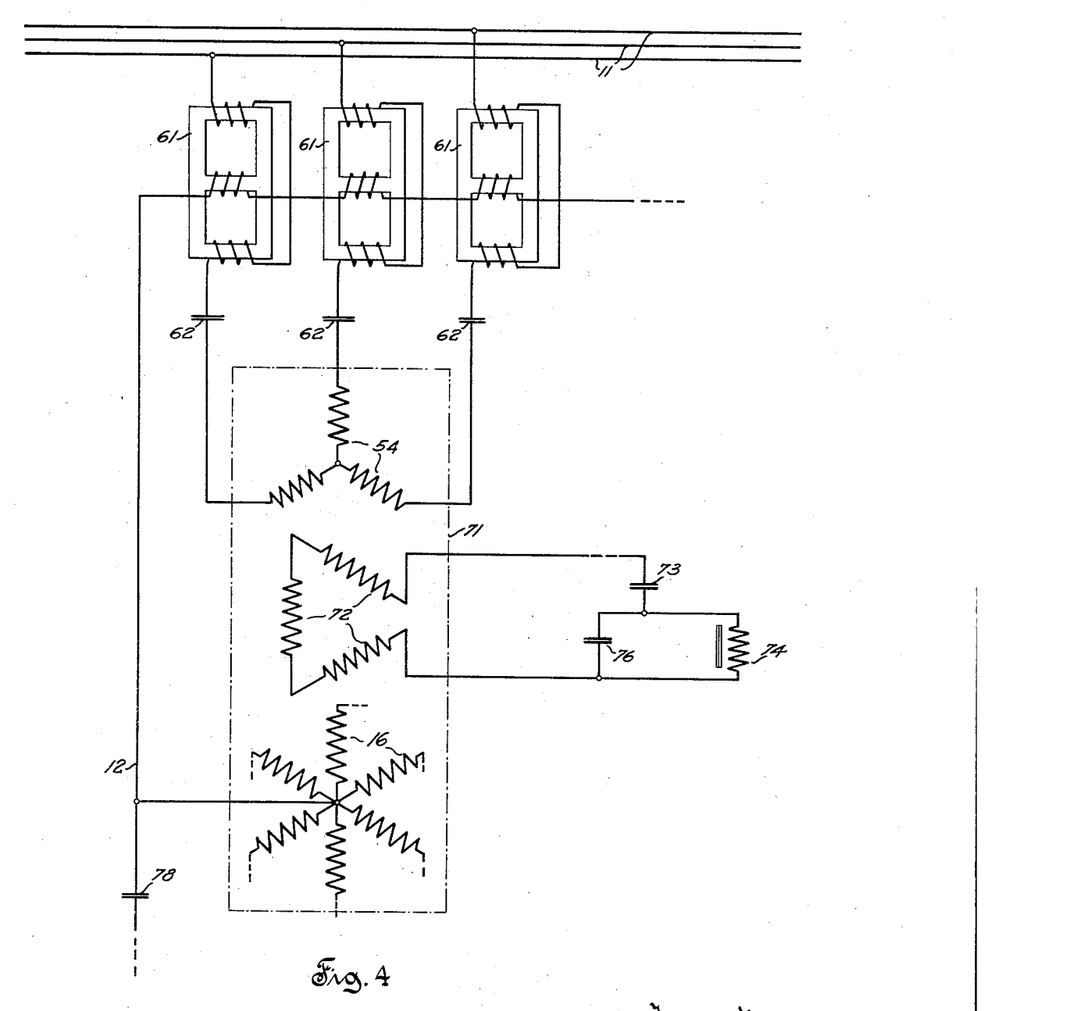
Fig. 4 partially illustrates a modified embodiment of the present invention utilized for controlling a system comprising a transformer having a primary winding connected in star by means of filters severally connected in series with the phase portions of the transformer primary winding.

The system partially illustrated in Fig. 4 utilizes a transformer 71 comprising a plurality of windings including windings 54 and 16 and a delta connected tertiary winding 72. For the purpose of causing the valves of the system to carry substantially equal currents during different periods each of extent equal to substantially one-half cycle of the fundamental frequency, each filter 61, 62 is connected between one portion of winding 54 and one of the conductors of circuit 11, and winding 72 is closed through any suitable filter having an impedance represented by the curve of Fig. 9d. Such filter may consist of a capacitor 73 connected in series with the parallel combination of a reactor 74 with a capacitor 76. Filters 63, 64 illustrated in Fig. 2 may be replaced by a single capacitor 78 connected across circuit 12 and having a high capacitance relative to the capacitance of capacitors 62 and to the inductance of reactors 61. One of the conductors of circuit 12 may supply direct current to saturating windings arranged on reactors 61 for modifying the inductance of such reactors.

Filters 61, 62 function in substantially the same manner as in the embodiment illustrated in Fig. 2 for causing the currents flowing through winding 54 to be substantially sinusoidal, the currents flowing through the portions of winding 16 and through the associated valves then being sinusoidal pulsating currents represented by curve 68 in Fig. 7d. In the absence of winding 72, however, the voltages appearing across the several portions of winding 64 would be unequal in magnitude as a result of the unavoidable lack of uniformity of the magnetic circuits severally linked with such winding portions, and the valves would carry unequal currents. To obtain the desired balanced flow of current through the transformer, winding 72 must be so connected that a current of fundamental frequency may flow freely therethrough to thereby restore the equality of the phase voltages in each winding of the transformer. Filter 73, 74, 76 is accordingly tuned with the transformer so as to have a substantially zero impedance for the flow of current of fundamental frequency therethrough, and a relatively high impedance for the flow of third harmonic current therethrough. The system then operates at loads not exceeding a predetermined value as represented by Fig. 7d, and the output characteristic of the system is represented by line 69. When the load current through circuit 12 exceeds the predetermined value, the cores of reactors 61 are saturated by the flow of the load current through the saturating windings thereof and the system then operates as represented by Fig. 7b, with an output characteristic represented by a line intermediate line 42 and line 52. The transition between the characteristics represented by line 69 and by the intermediate line may be more or less gradual depending upon the magnetic characteristics of reactors 61.

Figure 5:
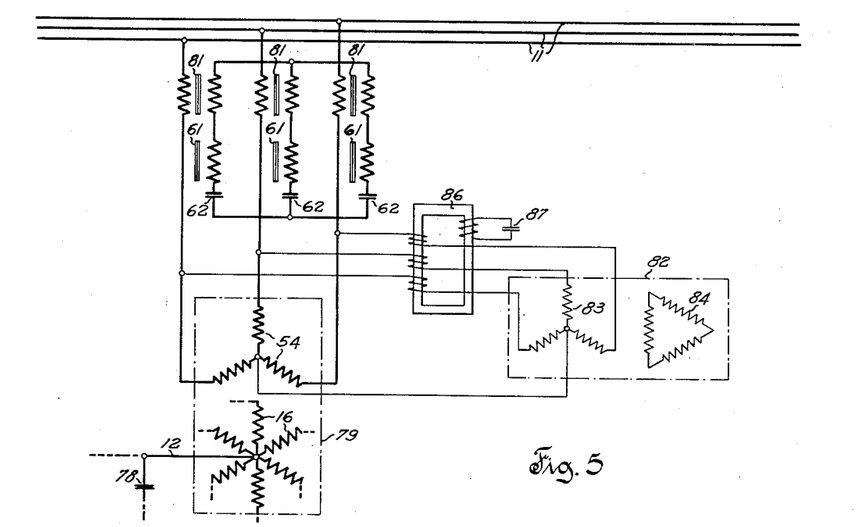
Fig. 5 partially illustrates another modified embodiment of the present invention differing from the embodiment illustrated in Fig. 4 in the means utilized for insuring the equality of the phase voltages of the transformer.

In the embodiment partially illustrated in Fig. 5, there is utilized a transformer 79 comprising primary winding 54 and secondary winding 16. As in the embodiment illustrated in Fig. 1, means are connected with a winding of the transformer exclusively of the secondary winding thereof to extend the periods of current flow through the valves. In the present embodiment, such means comprise filters 61, 62 which are connected with winding 54 through a plurality of current transformers 81. To insure equality of the voltages appearing across the different phase portions of winding 54, there is provided an auxiliary polyphase transformer 82 having a star connected primary winding 83 connected with the terminals and with the neutral point of winding 54, and a delta connected secondary winding 84 without external connection. Windings 83 and 54 are interconnected through filter means forming a path for the flow of balancing current of fundamental frequency through the phase portions of winding 54 and preferably consisting of a second auxiliary transformer 86 having windings arranged on a common core, the arrangement of such windings being similar to the arrangement of the windings of reactor 21 in Fig. 1. Transformer 86 may have a secondary winding supplying a capacitor 87. The operation of filters 61, 62, of transformer 79, and of the valves of the system illustrated in Fig. 5 is identical with the operation of the corresponding elements in the system illustrated in Fig. 4. Balancing current of fundamental frequency may flow freely from the conductors of circuit 11 through the primary windings of transformers 81, through the windings of transformer 86, and through winding 83 to the neutral point of winding 54 to cause the voltages appearing in the phase portions of winding 54 to remain equal. Third harmonic currents are, however, prevented from flowing through the windings of transformer 86 by reason of the arrangement of such windings on the associated core. Capacitor 87 serves to neutralize the reactance of transformers 86 and 82 for the flow of current of fundamental frequency therethrough to thereby facilitate the flow of such current.

Figure 6:
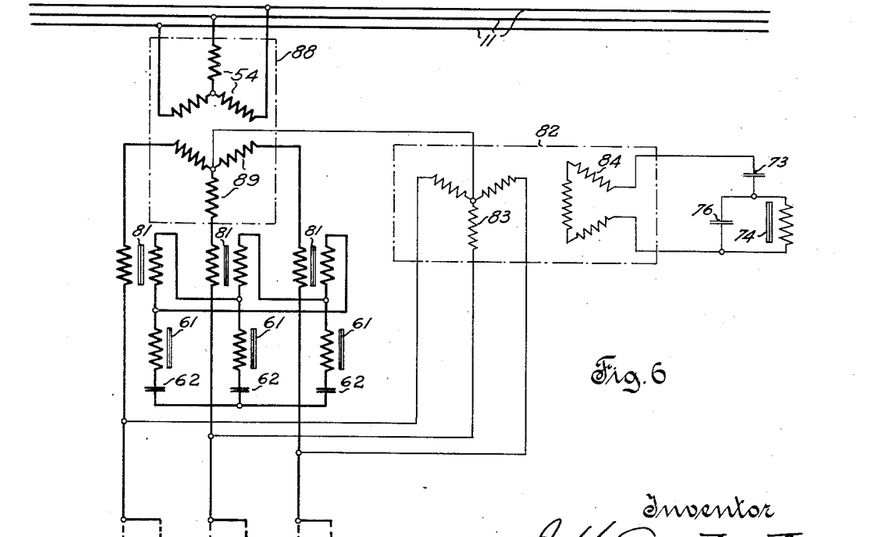
Fig. 6 partially illustrates a further modified embodiment of the invention differing from the embodiments illustrated in Figs. 4 and 5 by the connection of electric filters in series with the phase portions of the transformer secondary winding.

In the embodiment partially illustrated in Fig. 6, primary winding 54 and a star connected secondary winding 89 are utilized to form a main transformer 88 connected with a system of valves simliar to the system illustrated in Fig. 2. Transformer 88 may also be replaced by a three phase autotransformer if desired. The currents flowing in the connections between winding 89 and the valves are then alternating currents and such connections may include the primary windings of transformers 81. The secondary windings of transformers 81 may be connected in delta if desired, and filters 61, 62 may be connected in star as in the previously described embodiment. Winding 83 may be connected with winding 89 through transformers 81, and winding 84 may be utilized for supplying current to filter 73, 74, 76. Such filter permits the flow of current of fundamental frequency through the associated delta winding and prevents the flow of third harmonic current through such winding as in the embodiment illustrated in Fig. 4. The filter has the same effect as transformer 86 in the embodiment illustrated in Fig. 5 in causing transformer 82 to form a selective path for the flow of balancing current between the phase portions of the winding of the main transformer connected therewith. The voltages appearing across the phase portions of the main transformer windings are thereby balanced, and hence the currents flowing through the different valves of the system are of equal magnitude.

Although but a few embodiments of the present invention have been illustrated and described, it will be apparent to those skilled in the art that various changes and modifications may be made therein without departing from the scope of the appended claims or the spirit of the invention.

It is claimed and desired to secure by Letters Patent:

1. In an electric current translating system comprising an alternating current circuit and a direct current circuit, the combination of a transformer having a plurality of windings including a winding connected with said alternating current circuit and a second winding, a plurality of electric valves for connecting said second winding across said direct current circuit for the flow of current therebetween through the different valves during predetermined periods, and means for extending the periods of current flow through said valves at substantially all loads comprising impedance means connected with said transformer operating exclusively in dependence upon the flow of current through said transformer for modifying the wave form of the voltages appearing in said windings from the wave form of the voltage of said alternating current circuit.

2. In an electric current translating system comprising an alternating current circuit operating at a fundamental frequency and a direct current circuit, the combination of a transformer having a plurality of windings including a winding connected with said alternating current circuit and a second winding, a plurality of electric valves for connecting said second winding across said direct current circuit for the flow of current therebetween through the different valves during predetermined periods, and means for extending the periods of current flow through said valves at substantially all loads comprising impedance means connected with said transformer opposing a selective impedance to the flow of alternating currents of said fundamental frequency and multiples thereof exclusively through said transformer, said impedance being relatively low for the flow of currents of said fundamental frequency and being relatively high for the flow of currents of other frequencies including selected frequencies multiple of said fundamental frequency.

3. In an electric current translating system comprising an alternating current circuit and a direct current circuit, the combination of a transformer having a plurality of windings including a winding connected with said alternating current circuit and a second winding, a plurality of electric valves for connecting said second winding across said direct current circuit for the flow of current therebetween through the different valves, whereby the currents flowing through said winding tend to assume a non-sinusoidal wave form, and means connected with said transformer for causing the currents flowing through said windings to assume a substantially sinusoidal wave form.

4. In an electric current translating system comprising an alternating current circuit and a direct current circuit, the combination of a transformer having a plurality of windings including a winding connected with said alternating current circuit and a second winding, a plurality of electric valves for connecting said second winding across said direct current circuit for the flow of current therebetween through the different valves during predetermined periods, and means conductively connected with a winding of said transformer exclusively of said second winding for extending the periods of current flow through said valves.

5. In an electric current translating system comprising a three phase alternating current circuit operating at a fundamental frequency and a direct current circuit, the combination of a three phase transformer having a plurality of windings including a winding connected with said alternating current circuit and a second winding, one of said plurality of windings comprising a plurality of phase portions connected in delta connection, a plurality of electric valves for connecting said second winding across said direct current circuit for the flow of current therebetween, and means conductively connected with one of said windings exclusively of said second winding for substantially preventing the flow of currents of frequency triple of the fundamental frequency in said delta connected winding.

6. In an electric current translating system comprising a polyphase alternating current circuit operating at a fundamental frequency and a direct current circuit, the combination of a polyphase transformer having a plurality of windings including a winding connected with said alternating current circuit and a second winding, one of said plurality of windings comprising a plurality of phase portions connected in polygon connection, a plurality of electric valves for connecting said second winding across said direct current circuit for the flow of current therebetween, and means for controlling the flow of current through said valves comprising impedance means serially connected with said polygon connected winding, said impedance means and said windings jointly having a relatively low impedance for the flow of current of said fundamental frequency and a relatively high impedance for the flow of currents of selected frequencies multiple of said fundamental frequency.

7. In an electric current translating system comprising a three phase alternating current circuit operating at a fundamental frequency and a direct current circuit, the combination of a three phase transformer having a plurality of windings including a winding connected with said alternating current circuit and a second winding, one of said plurality of windings comprising a plurality of phase portions connected in delta connection, a plurality of electric valves for connecting said second winding across said direct current circuit for the flow of current therebetween, and means for controlling the flow of current through said valves comprising impedance means serially connected with said delta connecting winding, said impedance means and said windings jointly having a relatively low impedance for the flow of current of said fundamental frequency and a relatively high impedance for the flow of current of frequency triple of said fundamental frequency, and means connected across said direct current circuit forming a path of negligible impedance for the flow of currents of predetermined frequencies multiple of said fundamental frequency.

8. In an electric current translating system comprising a three phase alternating current circuit operating at a fundamental frequency and a direct current circuit, the combination of a three phase transformer having a plurality of windings including a winding connected with said alternating current circuit and a second winding, one of said plurality of windings comprising a plurality of phase portions connected in delta connection, a plurality of electric valves for connecting said second winding across said direct current circuit for the flow of current therebetween, and means for controlling the flow of current through said valves comprising impedance means serially connected with said delta connected winding and tuned with said transformer to resonance for said fundamental frequency to form a selective path for the flow of current of said fundamental frequency through said delta connected winding.

9. In an electric current translating system comprising a three phase alternating current circuit operating at a fundamental frequency and a direct current circuit, the combination of a three phase transformer having a plurality of windings including a winding connected with said alternating current circuit and a second winding, one of said plurality of windings comprising a plurality of phase portions connected in delta connection, a plurality of electric valves for connecting said second winding across said direct current circuit for the flow of current therebetween, and means for preventing the flow of currents of frequencies multiple of said fundamental frequency in said delta connected winding including a reactor connected in series with a capacitor and with the phase portions of said delta connected winding.

10. In an electric current translating system comprising a three phase alternating current circuit operating at a fundamental frequency and a direct current circuit, the combination of a three phase transformer having a plurality of windings including a winding connected with said alternating current circuit and a second winding, one of said plurality of windings comprising a plurality of phase portions connected in delta connection, a plurality of electric valves for connecting said second winding across said direct current circuit for the flow of current therebetween, and means including a reactor and a capacitor serially connected with said delta connected winding and tuned with said transformer to resonance for said fundamental frequency to form a selective path for the flow of current of fundamental frequency through said delta connected winding.

11. In an electric current translating system comprising a polyphase alternating current circuit operating at a fundamental frequency and a direct current circuit, the combination of a polyphase transformer having a plurality of windings including a winding connected with said alternating current circuit and a second winding, one of said windings having a plurality of portions connected to form a polygon of connections, a plurality of electric valves for connecting said second winding across said direct current circuit for the flow of current therebetween, and means for controlling the flow of current through said valves comprising a reactor having a plurality of windings arranged on a common core and severally inserted in the different sides of said polygon of connections.

12. In an electric current translating system comprising a three phase alternating current circuit operating at a fundamental frequency and a direct current circuit, the combination of a three phase transformer having a plurality of windings including a winding connected with said alternating current circuit and a second winding, one of said windings having three phase portions connected in delta connection, a plurality of electric valves for connecting said second winding across said direct current circuit for the flow of current therebetween, and means for controlling the flow of current through said valves comprising an auxiliary transformer having three primary windings arranged as a common core and severally connected in series with the phase portions of said delta connected winding and having a single phase secondary winding, and a capacitor connected with said single phase secondary winding.

13. In an electric current translating system comprising a three phase alternating current circuit operating at a fundamental frequency and a direct current circuit, the combination of a three phase transformer having a plurality of windings including a winding connected with said alternating current circuit and a second winding, one of said windings having three phase portions connected in delta connection, a plurality of electric valves for connecting said second winding across said direct current circuit for the flow of current therebetween, and means for controlling the flow of current through said valves comprising an auxiliary transformer having three primary windings arranged on a common core and severally connected in series with the phase portions of said delta connected winding and having a single phase secondary winding, said capacitor and said auxiliary transformer being tuned to resonance for a frequency triple of the fundamental frequency to lower the value of the critical load of the system.

14. In an electric current translating system comprising a three phase alternating current circuit operating at a fundamental frequency and a direct current circuit, the combination of a three phase transformer having a plurality of windings including a first winding connected with said alternating current circuit and a second winding, one of said windings having three phase portions connected in delta connection, a plurality of electric valves for connecting said second winding across said direct current circuit for the flow of current therebetween, and means for controlling the flow of current through said valves comprising an auxiliary transformer having three primary windings arranged on a common core and severally connected in series with the phase portions of said delta connected winding and having a single phase secondary winding, and a capacitor connected with said single phase secondary winding, said capacitor having an impedance of such low value as to cause the voltages appearing in the said first and second windings to be of substantially sinusoidal wave form.

15. In an electric current translating system comprising a polyphase alternating current circuit operating at a fundamental frequency and a direct current circuit, the combination of a polyphase transformer having a plurality of windings including a winding connected with said alternating current circuit and a second winding, a plurality of electric valves for connecting said second winding across said direct current circuit for the flow of current therebetween, and means connected with said transformer for causing said valves to carry substantially equal currents during different periods each of extent equal to substantially one-half cycle of the fundamental frequency.

16. In an electric current translating system, comprising a polyphase alternating current circuit operating at a fundamental frequency and a direct current circuit, the combination of a polyphase transformer having a plurality of windings including a winding connected with said alternating current circuit, and a second winding, a plurality of electric valves for connecting said second winding across said direct current circuit for the flow of current therebetween, and means for controlling the flow of current through said valves comprising filter means arranged in the connections between said transformer and one of said circuits divided into filter elements each comprising a reactor and a capacitor tuned with said transformer for the said fundamental frequency, and means connected across said direct current circuit forming a path of negligible impedance for the flow of currents of said multiple frequencies.

17. In an electric current translating system, comprising a polyphase alternating current circuit operating at a fundamental frequency and a direct current circuit, the combination of a polyphase transformer having a plurality of windings including a star connected winding connected with said alternating current circuit and a second winding, a plurality of electric valves for connecting said second winding across said direct current circuit for the flow of current therebetween, and means for controlling the flow of current through said valves comprising filter means arranged in the connections between said transformer and one of said circuits divided into filter elements each comprising a reactor and a capacitor tuned with said transformer for the said fundamental frequency, and means connected across said direct current circuit forming a path of negligible impedance for the flow of currents of frequencies multiple of said fundamental frequency, an auxiliary polyphase transformer connected with the terminals and the neutral point of one of said windings, and filter means connected with said auxiliary transformer forming a path for the flow of balancing currents of fundamental frequency through the phase portions of said one of said windings.

18. In an electric current translating system, comprising a polyphase alternating current circuit operating at a fundamental frequency and a direct current circuit, the combination of a polyphase transformer having a plurality of windings including a star connected winding connected with said alternating current circuit and a second winding, a plurality of electric valves for connecting said second winding across said direct current circuit for the flow of current therebetween, and means for controlling the flow of current through said valves including an auxiliary polyphase transformer connected with the terminals and with the neutral point of one of said windings, and filter means connected with said auxiliary transformer forming a path for the flow of balancing currents of fundamental frequency through the phase portions of said one of said windings.

ISADORE K. DORTORT.